United States Patent [19]

Mizuhara

[11] Patent Number: 4,606,980
[45] Date of Patent: Aug. 19, 1986

[54] DUCTILE ALUMINUM BASED BRAZING FOIL CONTAINING REACTIVE METALS AND COPPER

[75] Inventor: Howard Mizuhara, Hillsborough, Calif.

[73] Assignee: GTE Products Corporation, Stamford, Conn.

[21] Appl. No.: 691,347

[22] Filed: Dec. 24, 1984

Related U.S. Application Data

[63] Continuation of Ser. No. 420,074, Sep. 20, 1982, abandoned.

[51] Int. Cl.$^4$ .............................................. C22C 21/12
[52] U.S. Cl. ................................... 428/606; 148/438; 420/529
[58] Field of Search ...................... 420/529; 148/438; 428/606

[56] References Cited

U.S. PATENT DOCUMENTS 3,984,260 10/1976 Watts et al. ......................... 148/438

Primary Examiner—R. Dean
Attorney, Agent, or Firm—Donald R. Castle

[57] ABSTRACT

Aluminum based alloys containing controlled amounts of copper and a reactive metal selected from titanium, zirconium, vanadium and mixtures thereof are suitable for brazing ceramics and other non-metallic and metallic materials.

2 Claims, No Drawings

DUCTILE ALUMINUM BASED BRAZING FOIL CONTAINING REACTIVE METALS AND COPPER

This is a continuation of application Ser. No. 420,074, filed Sept. 20, 1982, now abandoned.

FIELD OF INVENTION

This invention relates to brazing alloys. More particularly it relates to brazing alloys containing a reactive metal having a liquidus temperature above about 600° C.

BACKGROUND

Alloys containing titanium are known. These alloys contain relatively high levels of titanium. Generally the titanium content is above about 7% by weight. These alloys are not ductile and cannot be rolled to a foil in a satisfactory manner and upon brazing contain a brittle dispersed phase.

SUMMARY OF THE INVENTION

Aluminum based brazing alloys containing specified amounts of a reactive metal and copper have liquidus temperatures in the range of from about 600° C. to about 640° C.; are ductile and after brazing are relatively free of hard dispersed phases.

DETAILS OF PREFERRED EMBODIMENTS

For a better understanding of the present invention, together with other and further objects, advantages and capabilities thereof, reference is made to the following disclosure and appended claims in connection with the foregoing description of some of the aspects of the invention.

The amount of the reactive metal in the aluminum base alloys of this invention which also contain copper cannot appreciably exceed about 5% by weight and achieve a ductile material which upon brazing is free of dispersed phases.

The amount of reactive metal in the alloys of this invention is from about 0.25% by weight to about 5% by weight, with from about 2% by weight to about 4% by weight being preferred. By reactive metal, within the context of this disclosure, it is meant titanium, zirconium, vanadium and mixtures thereof. When zirconium or vanadium are present in amounts of above about 2%, they adversely affect ductility. Therefore titanium is the preferred reactive metal.

The weight percent of copper can vary from about 1% by weight to about 5% by weight. The preferred level is generally from about 2% by weight to about 4% by weight.

Various alloys are prepared by skull melting using a tungsten electrode and an argon atmosphere. The alloy is ductile and is rolled to a foil using an intermediate vacuum anneal. The thickness of the foil is from about 2 to 6 mils.

The metallurgical composition of the alloy is about 94% by weight of aluminum, about 3% by weight of copper and about 3% by weight of titanium. The foil is placed between two pieces of alumina and heated to about 750° C. at $10^{-5}$ mm Hg pressure. The alloy flows well and exhibits good wettability of the ceramic. A joint free of dispersed phases is formed.

Substantially similar results are achieved when up to about 50% of the titanium is replaced with zirconium and vanadium.

While there has been shown and described what are at present considered the preferred embodiments of the invention, it will be obvious to those skilled in the art that various changes and modifications may be made therein without departing from the scope of the invention as defined by the appended claims.

What is claimed is:

1. An article consisting essentially of a ductile foil of a tertiary brazing alloy consisting essentially of from about 0.25% to about 5% weight of titanium, from about 1 to about 5% by weight of copper, balance aluminum.

2. An article according to claim 1 wherein said copper is from about 2% to about 4% by weight.

* * * * *